Figure 1:
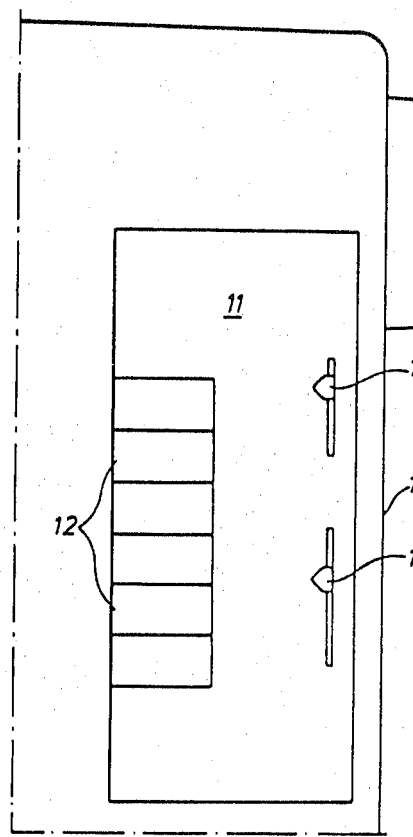

United States Patent [19]

Bergvall

[11] 4,399,759
[45] Aug. 23, 1983

[54] INPUT SELECTOR FOR AN ELECTRONIC SEWING MACHINE

[75] Inventor: Bengt A. Bergvall, Huskvarna, Sweden

[73] Assignee: Husqvarna Aktiebolag, Huskvarna, Sweden

[21] Appl. No.: 293,630

[22] PCT Filed: Dec. 10, 1980

[86] PCT No.: PCT/SE80/00328
§ 371 Date: Aug. 6, 1981
§ 102(e) Date: Aug. 6, 1981

[87] PCT Pub. No.: WO81/01718
PCT Pub. Date: Jun. 25, 1981

[30] Foreign Application Priority Data

Dec. 11, 1979 [SE] Sweden .......................... 7910200

[51] Int. Cl.³ .............................................. D05B 3/02
[52] U.S. Cl. ............................................... 112/158 E
[58] Field of Search .......... 112/158 E, 121.11, 121.12

[56] References Cited

U.S. PATENT DOCUMENTS 4,086,862  5/1978  Makabe et al. ................ 112/158 E
4,323,022  4/1982  Hanyu et al. .................. 112/158 E Primary Examiner—Peter P. Nerbun
Attorney, Agent, or Firm—Alfred E. Miller

[57] ABSTRACT

An input selector for a fancy seam sewing machine is provided with pattern selection means and an electronic seam memory for supplying stitch data to needle positioning and feeder mechanisms has, within the pattern selection means, at least one switch controlling the adjustment to a selected series of seams, e.g. utility seams, and a group of multi-pole contacts related to these seams. The contacts apply binary signals to the electronics of the machine and, in an illustrated embodiment with six double-pole contacts, a "two of four code" is achieved. This reduces the number wires required as compared with a system using single-pole switches.

7 Claims, 4 Drawing Figures

INPUT SELECTOR FOR AN ELECTRONIC SEWING MACHINE

This invention relates to a sewing machine provided with pattern selection means and an electronic memory for the supply of stitch data to needle positioning and feeding mechanisms for sewing fancy seams.

Within the art of electronic pattern data circuits for sewing machines several systems have been developed for the generation of control signals. Such a typical system may for instance be as follows:

There is a memory unit in which the patterns are stored so that every position of the needle in the transverse direction corresponds to a digital code word in the memory. Circuits of this kind must include an address counter in order to make the addressing of the successive needle position run forwards, which counter is stepped by pulses in synchronism with the running of the machine. The address counter is supplied with the address (start address) of the selected pattern. Such a start address is carried out by an input selector, e.g. a set of change-over switches, and a logic circuit for supplying a digital input signal to an address memory or the like. The address counter then releases the code words for everyone of the following stitches out of the memory as the fancy seam is sewn. The input selector here said and assumed to be a set of change-over switches can, in the known systems, be carried out as described in U.S. Pat. No. 3,913,506. The selector arrangement thus described has a row of single-pole switches, one of which is actuated for the selection of a pattern. All the switches comprise in an encoder, which generates a unique code for the selected seam. However, the encoder is complicated when using a large number of switches in the selector, a reason why it is desirable to simplify or, if possible, totally eliminate the same in the systems.

The present invention provides an input selector having a code generated in a row of switches, one by one representing one or more patterns. The requirement for an encoder is eliminated and, moreover, the number of wires from the selector is reduced as the information is already there composed of data bits. Thanks to the possibility of using double-pole switches in the selector a better reliability is achieved than by using sliding contacts, capacitive transducers etc. The selector according to the invention is simple but somewhat unconventional in form.

Figure 4:
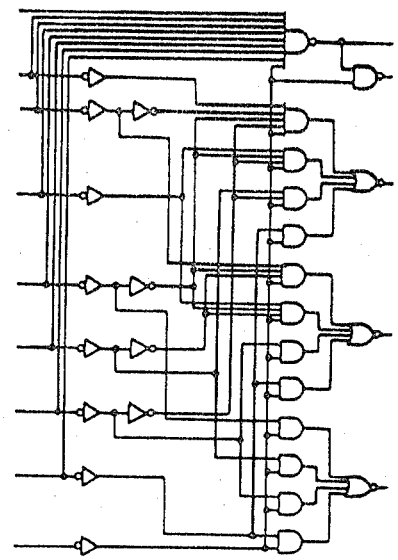
Figure 3:
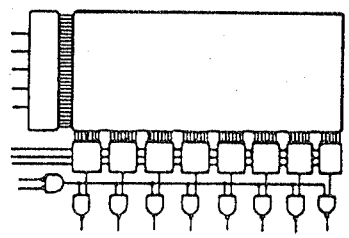
Figure 2:
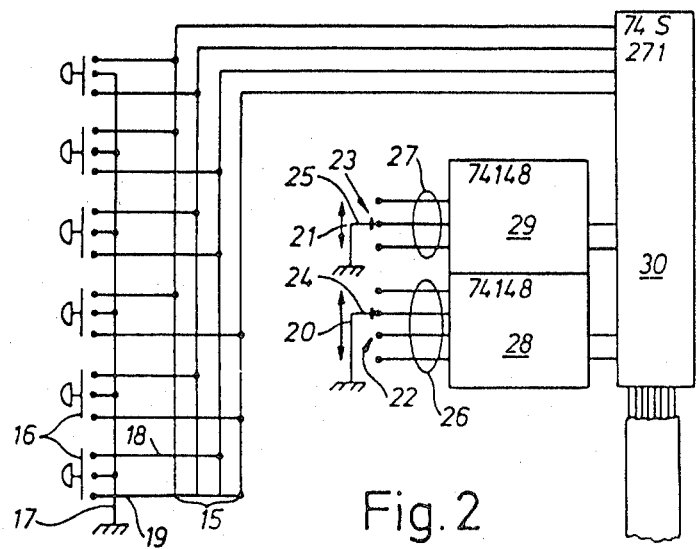

An embodiment of the input selector according to the invention will be described in the following paragraphs with reference to the accompanying drawing, wherein FIG. 1 shows a panel with pattern selection knobs of an input selector in a sewing machine, FIG. 2 is a wiring diagram of the input selector, FIG. 3 is an embodiment of a start address memory (standard circuit TTL "271") to which the input selector is connected, and FIG. 4 is a diagram of an encoder (standard circuit "74148").

A panel 11 is provided as a carrier for a set of push-buttons 12 and a pair of controls 13, 14 on a sewing machine provided with a post 10. These buttons and controls are used for transferring a determined selection of a seam to the electronics in the machine, e.g. the controls may be used for re-adjustment of a determined series of seam patterns, for instance utility seams of which at least one can be selected the buttons 12. When the operator pushes such a button, a so-called seam selection code is created which is fed to a so-called start address memory (FIG. 3), which is here assumed to be a standard circuit TTL 74S271. The procedure of creating such a code is explained with reference to FIG. 2.

In the illustrated embodiment the number of push-buttons is 6, since this number of double-pole combinations go into a four-wire group 15 (4-bits code). If more combinations are desired, e.g. ten, another wire is needed (5-bit code) etc. A double-pole switch 16 is provided for every push-button and has a common (ground) contact 17, through which the two other contacts 18, 19 connected to two of the wires 15 are grounded. The distribution of the contacts 18, 19 of the several switches 16 to the wires 15 is such that a pushed, arbitrary button 12 applies a unique code to the output wires 15 in the form of a current in two of them, since all of them are connected to a voltage source.

The controls 13, 14 are a pair of change-over switches, which multiply the number of selectable patterns. Assuming for example four positions on the control 13 and three on the control 14, $4 \times 3 = 12$ different series of seams are obtained, each one including six seams on the push-buttons 12 in the shown embodiment. The controls may be in the form of single-pole change-over switches 20, 21 with four contacts 22 and three contacts 23, respectively, and movable common contacts 24, 25, respectively. On each one of the wire groups 26, 27, respectively, from the switches, a wire conducts a current in depending upon the adjustment on the respective switch. These groups go into either one of the encoders of the type (FIG. 4) which here are assumed to be standard circuits in TTL 74148 and give a unique 2-bits code for each one of the inputs which is grounded.

A selection of a seam made by the adjustment of the controls 13, 14 and pushing a button 12 is represented by a 4-bits code on the group 15 and 2-bits codes on the outputs of the encoders 28, 29. These codes make together an 8-bits code which is fed to the start address memory 30. An address word is released in that memory by the code and constitutes the first step in a data process within a row of functional blocks of which the data system is composed. This process need not be described in detail here, instead reference is made to prior described systems in which the present invention may be used, e.g. U.S. Pat. No. 4,108,091 or 4,227,472. This above described embodiment of the invention is an example of how it may be exercised. In fact, the switches 21, 22 can alternatively have binary coded contacts, whereby the encoders associated with them may be eliminated.

I claim:

1. In an input selector for an electronic sewing machine provided with addressing and activating circuits and a memory unit for production of stitch codes for carrying out pattern seams by the stitch forming instrumentalities of the machine; the improvement wherein the selector comprises a set of electric switches with multi-pole contacts and connected to produce binary codes on a wire group coupled to said addressing circuits and memory, there being at most the same number of wires in said wire group coupled to the poles of any of said switches as the number of poles in the respective switch.

2. An input selector according to claim 1, wherein a voltage is applied to all the wires of said group and that every switch has a common contact to which all of the respective poles are connected when the switch is activated.

3. An input selector according to claim 1, wherein further controls and wires are coupled to inputs to the addressing circuits and the memory, whereby the capacity of the input selector is multiplied.

4. An input selector according to claim 3, wherein push-buttons for actuating the switches of the said set and slide or turn contacts for said controls are located on the front surface of the machine.

5. The input selector of claim 1 wherein each said electric switch has a common contact and a plurality of pole contacts, the common contact being connected to all of the respective pole contacts upon actuation of the respective switch, the pole contacts of said switches being connected to separate single wires of said wire group.

6. The input selector of claim 5 wherein the common contact of each of said switches is coupled to a reference potential and a fixed different potential is applied to the wires of said group.

7. The input selector of claim 5 wherein each of said switches has the same number of pole contacts and the pole contacts of each switch are connected to a different set of wires of said wire group.

* * * * *